US010472537B2

(12) United States Patent
Watanabe et al.

(10) Patent No.: US 10,472,537 B2
(45) Date of Patent: Nov. 12, 2019

(54) COATING COMPOSITION

(71) Applicant: KANSAI PAINT CO. LTD., Hyogo (JP)

(72) Inventors: Kazuya Watanabe, Kanagawa (JP); Akinori Nagai, Kanagawa (JP)

(73) Assignee: KANSAI PAINT CO. LTD., Hyogo (JP)

( * ) Notice: Subject to any disclaimer, the term of this patent is extended or adjusted under 35 U.S.C. 154(b) by 0 days.

(21) Appl. No.: 15/765,099

(22) PCT Filed: Sep. 8, 2016

(86) PCT No.: PCT/JP2016/076522
§ 371 (c)(1),
(2) Date: Mar. 30, 2018

(87) PCT Pub. No.: WO2017/056911
PCT Pub. Date: Apr. 6, 2017

(65) Prior Publication Data
US 2018/0265730 A1 Sep. 20, 2018

(30) Foreign Application Priority Data

Oct. 1, 2015 (JP) .................. 2015-195551

(51) Int. Cl.
*C09D 133/00* (2006.01)
*C09D 133/10* (2006.01)
*B05D 7/24* (2006.01)
*C09D 201/06* (2006.01)
*C09D 7/62* (2018.01)
*C08K 3/36* (2006.01)
*C08L 75/04* (2006.01)

(52) U.S. Cl.
CPC ............. *C09D 133/10* (2013.01); *B05D 7/24* (2013.01); *C09D 7/62* (2018.01); *C09D 201/06* (2013.01); *C08K 3/36* (2013.01); *C08L 75/04* (2013.01)

(58) Field of Classification Search
CPC ...... C09D 133/10; C09D 7/62; C09D 133/00; C08K 3/36; C08L 75/04; B05D 201/06
USPC ....................................... 523/205
See application file for complete search history.

(56) References Cited

U.S. PATENT DOCUMENTS

| 4,330,446 | A  | * | 5/1982 | Miyosawa | B05D 7/14 428/418 |
| 6,736,890 | B2 | * | 5/2004 | Haruta   | C09D 1/00 106/287.1 |
| 8,530,545 | B2 | * | 9/2013 | Kumar    | B82Y 30/00 523/202 |
| 2004/0156809 | A1 | | 8/2004 | Ono et al. | |
| 2018/0127614 | A1 | * | 5/2018 | Shinke   | C09D 7/69 |
| 2018/0265717 | A1 | * | 9/2018 | Watanabe | C09D 7/40 |

FOREIGN PATENT DOCUMENTS

| JP | H6336558 | A  | 12/1994 |
| JP | H8319400 | A  | 12/1996 |
| JP | H9302257 | A  | 11/1997 |
| JP | H11124467 | A | 5/1999 |
| JP | H11241047 | A | 9/1999 |
| JP | 2006160802 | A | 6/2006 |
| JP | 2008121011 | A | 5/2008 |
| JP | 2010235783 | A | 10/2010 |
| JP | 2011508058 | A | 3/2011 |
| JP | 2013249400 | A | 6/2012 |
| JP | 201353305 | A  | 3/2013 |
| JP | 201379323 | A  | 5/2013 |
| WO | 2002100356 | A1 | 12/2002 |
| WO | 2009085740 | A2 | 12/2008 |

OTHER PUBLICATIONS

English Machine Translation for JP2013079323, Publication Date: May 2, 2013.
English Machine Translation for JP2013249400, Publication Date: Jun. 1, 2012.
English Machine Translation for JP2013053305, Publication Date: Mar. 21, 2013.
English Machine Translation for JPH11241047, Publication Date: Sep. 7, 1999.
English Machine Translation for JPH11124467, Publication Date: May 11, 1999.
English Machine Translation for JPH09302257, Publication Date: Nov. 25, 1997.
English Machine Translation for JP2006160802, Publication Date: Jun. 22, 2006.
English Machine Translation for JP06336558, Publication Date: Dec. 6,1994.

(Continued)

*Primary Examiner* — Hannah J Pak
(74) *Attorney, Agent, or Firm* — Millen White Zelano and Branigan, PC; John Sopp

(57) ABSTRACT

There is provided a coating composition with excellent storage stability, and with excellent mar resistance for obtained coating films. The coating composition comprises a hydroxyl group-containing resin (A), a curing agent (B) and a dispersion of acrylic resin-coated silica particles (C), the dispersion of acrylic resin-coated silica particles (C) being an acrylic resin-coated silica particle dispersion obtained by reacting silica particles with a polymerizable unsaturated group (c1) and a polymerizable unsaturated monomer (c2) in a mass ratio of (c1):(c2)=20:80 to 90:10, the polymerizable unsaturated monomer (c2) including a specific polymerizable unsaturated monomer (c2-1) as at least a portion of its components, and the molecular weight of the resin covering the silica particles being 400 to 6000.

5 Claims, No Drawings

(56) References Cited

OTHER PUBLICATIONS

English Machine Translation for JP2008121011, Publication Date: May 29, 2008.
English Machine Translation for JP2010235783, Publication Date: Oct. 21, 2010.
English Machine Translation for JPH08319400, Publication Date: Dec. 3, 1996.

* cited by examiner

COATING COMPOSITION

TECHNICAL FIELD

The present invention relates to a coating composition with excellent storage stability, and with excellent mar resistance for obtained coating films.

BACKGROUND ART

Coating materials that are to be applied onto articles to be coated, such as automobile bodies, must have excellent film performance including mar resistance, and must also produce an excellent outer appearance for the coating films. The types of scuffing damage that can occur include scuffing damage by car washing and scratching damage by coins or keys, which are known to have different damage mechanisms, and resistance to both kinds of damage is desirable. On the other hand, increasing viscosity or precipitation that may occur during storage of a coating material can make its application difficult, and therefore storage stability is also required for coating materials.

PTL 1, for example, discloses a coating composition comprising (A) a polyol compound with 3 or more hydroxyl groups in the molecule and having a hydroxyl value in the range of 110 to 700 mgKOH/g and a number-average molecular weight in the range of 200 to 1,800, (B) a polyisocyanate compound, and (C) a resin-coated silica particle dispersion, wherein the resin-coated silica particle dispersion (C) is a resin-coated silica particle dispersion obtained by reacting (c1) silica particles having a polymerizable unsaturated group with (c2) a polymerizable unsaturated monomer in a mass ratio of (c1):(c2)=20:80 to 90:10, and the content of the resin-coated silica particle dispersion (C) is in the range of 5 to 75 mass % based on the total solid content of the polyol compound (A), the polyisocyanate compound (B) and the resin-coated silica particle dispersion (C). This coating composition, however, while having excellent resistance to car washing scuff damage, has been less satisfactory in terms of resistance to scratch marks by coins and keys, and storage stability.

Moreover, PTL 2 discloses a coating composition comprising (A) silica particles having the surfaces modified by a specific hydrolyzable silane compound (a), and (B) a binder component. This coating composition, however, while having excellent resistance to car washing scuff damage, has been less satisfactory in terms of resistance to scratch marks by coins and keys, and storage stability.

PTL 3 discloses a coating composition comprising (A) a hydroxyl group-containing acrylic resin which is a copolymer of monomer components comprising (a) 25 to 50 mass % of a hydroxyl group-containing polymerizable unsaturated monomer, (b) 5 to 30 mass % of an alicyclic hydrocarbon group-containing polymerizable unsaturated monomer of 6 to 20 carbon atoms and (c) 20 to 70 mass % of another polymerizable unsaturated monomer, (B) a polyisocyanate compound comprising an aliphatic diisocyanate wherein the isocyanurate trimer content is 30 to 70 mass %, the uretdione dimer content is 3 to 30 mass % and the multimer content of other tri- or greater polymers is 0 to 67 mass %, based on the total amount of the polyisocyanate compound, and (C) polysiloxane-modified silica particles with a mean primary particle size of 1 to 40 nm. This coating composition, however, while having excellent resistance to car washing scuff damage, has been less satisfactory in terms of resistance to scratch marks by coins and keys, and storage stability.

PTL 4 discloses a coating composition comprising as essential components, (I) a colloidal silica-containing acrylic-based resin obtained by copolymerization of (a) colloidal silica that is modified with a hydrolyzable alkoxysilyl group-containing unsaturated monomer and evenly dispersed in an organic solvent, (b) a specific polysiloxane-based macromonomer, (c) a hydroxyl group-containing unsaturated monomer and if necessary (d) another unsaturated monomer, and (II) a curing agent. However, this coating composition, while having excellent resistance to car washing scuff damage, has been less satisfactory in terms of resistance to scratch marks by coins and keys, and storage stability.

PTL 5 discloses composite microparticles having an organic polymer integrated with inorganic fine particles, the composite microparticles containing an ethylenic unsaturated group. However, when the inorganic fine particles are used in a coating material, although they provide excellent resistance to car washing scuff damage, they have been less satisfactory in terms of resistance to scratch marks by coins and keys, and storage stability.

PTL 6 discloses organic polymer-composite inorganic fine particles having an organic polymer immobilized on the surfaces of inorganic fine particles, the organic polymer including a perfluoroalkyl and/or silicone group. However, when the inorganic fine particles are used in a coating material, although they provide excellent resistance to pencil scratch marks, they have been less satisfactory in terms of car washing scuff damage and storage stability.

CITATION LIST

Patent Literature

[PTL 1] Japanese Unexamined Patent Publication No. 2013-79323
[PTL 2] Japanese Unexamined Patent Publication No. 2013-249400
[PTL 3] Japanese Unexamined Patent Publication No. 2013-53305
[PTL 4] Japanese Unexamined Patent Publication HEI No. 11-241047
[PTL 5] Japanese Unexamined Patent Publication HEI No. 11-124467
[PTL 6] Japanese Unexamined Patent Publication HEI No. 9-302257

SUMMARY OF INVENTION

Technical Problem

It is an object of the present invention to provide a coating composition with excellent storage stability, and with excellent mar resistance for obtained coating films.

Solution to Problem

Specifically, the present invention relates to a coating composition comprising (A) a hydroxyl group-containing resin, (B) a curing agent and (C) a dispersion of acrylic resin-coated silica particles, wherein the dispersion of acrylic resin-coated silica particles (C) is an acrylic resin-coated silica particle dispersion that is the reaction product of silica particles with a polymerizable unsaturated group (c1) and a polymerizable unsaturated monomer (c2), in a mass ratio of (c1):(c2)=20:80 to 90:10, the polymerizable unsaturated monomer (c2) includes, as at least a portion of its components, a polymerizable unsaturated monomer (c2-1) represented by the following formula (I):

[Chemical Formula 1]

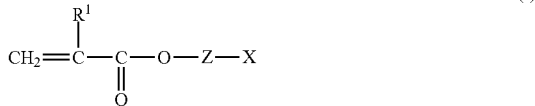

(I)

(wherein $R^1$ represents a hydrogen atom or a methyl group, Z represents a structure including the following formula (II), and X represents a hydrogen atom or a (meth)acryloyl, alkyl, hydroxyl, amino, (alicyclic) epoxy, carboxyl, mercapto, vinyl, isocyanate or aryl group).

[Chemical Formula 2]

(II)

(wherein m represents a number of 5.5 to 160, $R^2$ represent phenyl groups or alkyl groups of 1 to 6 carbon atoms, which may be the same or different, and $R^3$ represents an alkylene group of 1 to 6 carbon atoms),
and the molecular weight of the resin covering the silica particles is 400 to 6000.

Advantageous Effects of Invention

According to the coating composition of the invention, it is possible to form a coating film with excellent storage stability, and also with excellent mar resistance in car washing and mar resistance to coins and keys.

DESCRIPTION OF EMBODIMENTS

The present invention will now be described in detail. The coating composition of the invention (hereunder also referred to simply as "the present coating material") is a coating composition comprising a hydroxyl group-containing resin (A), a curing agent (B) and a dispersion of acrylic resin-coated silica particles (C), the dispersion of acrylic resin-coated silica particles (C) being an acrylic resin-coated silica particle dispersion obtained by reacting silica particles with a polymerizable unsaturated group (c1) and a polymerizable unsaturated monomer (c2) in a mass ratio of (c1):(c2)=20:80 to 90:10, the polymerizable unsaturated monomer (c2) including a specific polymerizable unsaturated monomer (c2-1) as at least a portion of its components, and the molecular weight of the resin covering the silica particles being 400 to 6000. Each of the components will now be explained in greater detail.

Hydroxyl Group-Containing Resin (A)

The hydroxyl group-containing resin (A) is not particularly restricted so long as it contains a hydroxyl group, and any publicly known thermosetting resin may be used.

Examples include alkyd resins, polyester resins, acrylic resins and cellulose resins, with hydroxyl group-containing acrylic resins being preferred from the viewpoint of weather resistance and mar proofness of the coating film.

The hydroxyl group-containing acrylic resin can be produced by copolymerizing a hydroxyl group-containing polymerizable unsaturated monomer and another polymerizable unsaturated monomer that is copolymerizable with the hydroxyl group-containing polymerizable unsaturated monomer.

The hydroxyl group-containing polymerizable unsaturated monomer is a compound having one or more hydroxyl groups and polymerizable unsaturated groups in the molecule.

Specifically preferred hydroxyl group-containing polymerizable unsaturated monomers are monoesters of acrylic acid or methacrylic acid with dihydric alcohols of 2 to 10 carbon atoms, examples of which include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, caprolactone-modified hydroxyl group-containing (meth)acrylate and 4-methylolcyclohexyl (meth)acrylate. An example of a commercially available caprolactone-modified hydroxyl group-containing (meth)acrylate is "PLACCEL FM" (trade name of Dicel Chemical Industries, Ltd.), and an example of a commercially available 4-methylolcyclohexyl acrylate is "CHDMMA" (trade name of Nippon Kasei Chemical Co., Ltd.).

From the viewpoint of mar resistance of the formed coating film, the hydroxyl group-containing polymerizable unsaturated monomer is most preferably a polymerizable unsaturated monomer having a hydroxyl group-containing hydrocarbon group of 3 to 20 carbon atoms, and specifically 2-hydroxypropyl (meth)acrylate, 4-hydroxybutyl (meth)acrylate and 4-methylolcyclohexyl acrylate are preferred for use.

The hydroxyl group in the hydroxyl group-containing polymerizable unsaturated monomer functions as a cross-linkable functional group for the obtained copolymer resin.

The other polymerizable unsaturated monomer that is copolymerizable is a compound having one or more polymerizable unsaturated groups per molecule, other than the aforementioned hydroxyl group-containing polymerizable unsaturated monomer, and specific examples thereof are listed as (1) to (11) below.

(1) Aromatic polymerizable unsaturated monomers: Examples include styrene, α-methylstyrene and vinyltoluene.

(2) Alicyclic hydrocarbon group-containing polymerizable unsaturated monomers of 3 to 20 carbon atoms: Examples include bridged alicyclic hydrocarbon group-containing polymerizable unsaturated monomers of 10 to 20 carbon atoms, such as isobornyl (meth)acrylate, tricyclodecanyl (meth)acrylate, adamantyl (meth)acrylate, 3,5-dimethyladamantyl (meth)acrylate and 3-tetracyclododecyl (meth)acrylate, and alicyclic hydrocarbon group-containing polymerizable unsaturated monomers of 3 to 12 carbon atoms such as cyclohexyl (meth)acrylate, 4-methylcyclohexylmethyl (meth)acrylate, 4-ethylcyclohexylmethyl (meth)acrylate, 4-methoxycyclohexylmethyl (meth)acrylate, t-butylcyclohexyl (meth)acrylate, cyclooctyl (meth)acrylate, cyclododecyl (meth)acrylate and tetrahydrofurfuryl (meth)acrylate.

(3) Polymerizable unsaturated monomers with hydrocarbon groups of 8 or more carbon atoms, having a branched structure: Examples include 2-ethylhexyl (meth)acrylate, isooctyl (meth)acrylate, isomyristyl (meth)acrylate and isostearyl (meth)acrylate. A commercially available product is "Isostearyl Acrylate" (trade name of Osaka Organic Chemical Industry, Ltd.).

(4) C1-7 Straight-chain or branched alkyl esters of (meth) acrylic acid: Methyl (meth)acrylate, ethyl (meth)acrylate, propyl (meth)acrylate, isopropyl (meth)acrylate, butyl (meth)acrylate, isobutyl (meth)acrylate and t-butyl (meth)acrylate.

(5) C8-22 Straight-chain alkyl esters of (meth)acrylic acid: Examples include lauryl (meth)acrylate and stearyl (meth)acrylate.

(6) Epoxy group-containing polymerizable unsaturated monomers: Examples include glycidyl (meth)acrylate.

(7) Nitrogen-containing polymerizable unsaturated monomers: Examples include (meth)acrylamide, N,N-dimethylaminoethyl (meth)acrylate, vinylpyridine and vinylimidazole.

(8) Other vinyl compounds: Examples include vinyl acetate, vinyl propionate, vinyl chloride, vinylidene chloride, divinyl ether, and the vinyl versatate esters "VEOVA 9" and "VEOVA 10" (trade names of Japan Epoxy Resins Co., Ltd.).

(9) Unsaturated group-containing nitrile compounds: Examples include (meta)acrylonitrile.

(10) Acidic functional group-containing polymerizable unsaturated monomers: Examples include carboxyl group-containing unsaturated monomers such as (meth)acrylic acid, crotonic acid, itaconic acid, maleic acid and maleic anhydride; sulfonic acid group-containing unsaturated monomers such as vinylsulfonic acid and sulfoethyl (meth)acrylate; and acidic phosphoric acid ester-based unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-(meth)acryloyloxyethylphenyl phosphate.

(11) Alkoxysilyl group-containing polymerizable unsaturated monomers: Examples include vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane and vinyl-tris(β-methoxyethoxy)silane.

The other polymerizable unsaturated monomers that are copolymerizable may be used alone or in combinations of two or more.

A polymerizable unsaturated monomer mixture, comprising the hydroxyl group-containing polymerizable unsaturated monomer and the other polymerizable unsaturated monomer, may be copolymerized to obtain a hydroxyl group-containing acrylic resin.

From the viewpoint of mar proofness and finished appearance, the hydroxyl group-containing polymerizable unsaturated monomer may be suitably used in a proportion of 15 to 50 mass % and preferably 20 to 45 mass %, based on the total mass of the copolymerizing monomer components.

From the viewpoint of finished appearance (especially gloss), water resistance and weather resistance, other polymerizable unsaturated monomers used are preferably those of monomer (1) mentioned above, and are appropriately used in a proportion of about 3 to 40 mass % and preferably about 5 to 30 mass %, based on the total mass of the copolymerizing monomer components.

From the viewpoint of finished appearance and water resistance, the other polymerizable unsaturated monomers used are preferably those of monomer (2) mentioned above, and are appropriately used in a proportion of about 3 to 40 mass % and preferably about 5 to 30 mass %, based on the total mass of the copolymerizing monomer components.

From the viewpoint of spreadability onto articles to be coated, and finished appearance, the other polymerizable unsaturated monomers used are preferably those of monomer (3) mentioned above, and are appropriately used in a proportion of about 3 to 45 mass % and preferably about 8 to 40 mass %, based on the total mass of the copolymerizing monomer components.

From the viewpoint of obtaining a resin that is highly superior in terms of both acid resistance and mar proofness of the coating film, the total mass of monomer (1), monomer (2) and monomer (3), based on the total mass of the copolymerizing monomer components, is in the range of preferably about 35 to 85 mass % and more preferably about 40 to 80 mass %, based on the total mass of the copolymerizing monomer component.

Among the other polymerizable unsaturated monomers, acidic functional group-containing polymerizable unsaturated monomers such as carboxyl group-containing unsaturated monomers, sulfonic acid group-containing unsaturated monomers and acidic phosphoric acid ester-based unsaturated monomers may be used as internal catalysts during the crosslinking reaction of the obtained hydroxyl group-containing resin with a polyisocyanate compound, in which case they may be used in amounts in the range of preferably about 0.1 to 5 mass % and more preferably about 0.5 to 3 mass %, based on the total amount of the monomer mixture composing the resin.

The method of copolymerizing the monomer mixture to obtain the hydroxyl group-containing acrylic resin is not particularly restricted, and any publicly known copolymerization method may be used. It is most preferred to use a solution polymerization method in which polymerization is conducted in an organic solvent in the presence of a polymerization initiator.

Examples of organic solvents to be used in the solution polymerization method include aromatic solvents such as toluene, xylene and high-boiling-point aromatic hydrocarbons; esteric solvents such as ethyl acetate, butyl acetate, 3-methoxybutyl acetate, ethyleneglycol ethyl ether acetate and propyleneglycol methyl ether acetate; ketone-based solvents such as methyl ethyl ketone, methyl isobutyl ketone and methyl amyl ketone; glycol ether-based solvents such as ethyleneglycol monomethyl ether, ethyleneglycol monoethyl ether, diethyleneglycol monomethyl ether, ethyleneglycol monobutyl ether and propyleneglycol monomethyl ether; and propyl propionate, butyl propionate, ethoxyethyl propionate, and the like. Examples of commercially available high-boiling-point aromatic hydrocarbons include "SWASOL 1000" (trade name of Cosmo Oil Co., Ltd., high-boiling-point petroleum-based solvent).

Any one of these organic solvents may be used, or two or more may be used in combination. Particularly when the hydroxyl group-containing acrylic resin has a high hydroxyl value, the organic solvent used is preferably a high-boiling-point esteric solvent or ketone-based solvent, from the viewpoint of solubility of the resin. High boiling point aromatic solvents may also be used in combinations.

Examples of polymerization initiators that may be used for copolymerization of hydroxyl group-containing acrylic resins include publicly known radical polymerization initiators such as 2,2'-azobisisobutyronitrile, benzoyl peroxide, 2,2-di(t-amylperoxy)butane, di-t-butyl peroxide, di-t-amyl peroxide, t-butyl peroctoate and 2,2'-azobis(2-methylbutyronitrile).

The hydroxyl group-containing acrylic resin may consist of a single type of copolymer, or it may comprise two or more types of copolymers.

From the viewpoint of both mar proofness and water resistance, the hydroxyl value of the hydroxyl group-containing acrylic resin is in the range of preferably 10 to 200 mgKOH/g, more preferably 50 to 200 mgKOH/g and even more preferably 80 to 200 mgKOH/g.

From the viewpoint of acid resistance and finished appearance, the weight-average molecular weight of the hydroxyl group-containing acrylic resin is in the range of preferably 5,000 to 30,000, more preferably 5,000 to 20,000 and even more preferably 10,000 to 20,000.

The weight-average molecular weight referred to throughout the present specification is the value calculated from a chromatogram measured by gel permeation chromatography, with the molecular weight of standard polystyrene as reference. The gel permeation chromatograph used was a "HLC8120GPC" (product of Tosoh Corp.). Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 cc/min, detector: RI.

From the viewpoint of coating film hardness and finished appearance, the glass transition temperature of the hydroxyl group-containing acrylic resin is preferably in the range of −30° C. to 30° C. and especially −20° C. to 20° C.

Curing agent (B)

The curing agent used may be a polyisocyanate compound (including blocked compounds), or an amino resin such as a melamine resin, guanamine resin or urea resin. From the viewpoint of obtaining a coating film with excellent weather resistance, mar proofness, coating film hardness and adhesion, a polyisocyanate compound and/or melamine resin is preferred.

A polyisocyanate compound is a compound having two or more isocyanate groups in the molecule.

Examples of polyisocyanate compounds include organic diisocyanates, among which are aliphatic diisocyanates such as hexamethylene diisocyanate and trimethylhexamethylene diisocyanate; cyclic aliphatic diisocyanates such as hydrogenated xylylene diisocyanates and isophorone diisocyanate; and aromatic diisocyanates such as tolylene diisocyanate and 4,4'-diphenylmethane diisocyanate, as well as addition products of these organic diisocyanates with polyhydric alcohols, low molecular weight polyester resins or water, or cyclized polymers of the aforementioned organic diisocyanates, or isocyanate/biurets, and these polyisocyanate compounds may also be used in a form blocked with a blocking agent. When a blocked isocyanate compound is used, it is preferred to use a dissociation catalyst in combination with it.

Examples of representative commercially available isocyanate compounds include BURNOCK D-750, -800, DN-950, -970 and 15-455 (all trade names of DIC Corp.), SUMIDUR N3300 or N3390 (both trade names of Sumitomo Bayer Urethane Co., Ltd.), and DURANATE 24A-100, TPA-100, TLA-100 and P301-75E (all trade names of Asahi Kasei Chemicals Corp.).

Polyisocyanate compounds with blocked isocyanate groups include those obtained by blocking polyisocyanate compounds having free isocyanate groups with known blocking agents such as oximes, phenols, alcohols, lactams, malonic acid esters or mercaptanes. Examples of representative commercial products include BURNOCK D-550 (trade name of DIC Corp.) and DURANATE SBN-70 (trade name of Asahi Kasei Corp.).

Examples of melamine resins that are preferred for use include melamine resins having the methylol groups of methylolated melamines etherified with monohydric alcohols of 1 to 8 carbon atoms. An etherified melamine resin may have all of the methylol groups of the methylolated melamine etherified, or only partially etherified with residual methylol groups or imino groups.

Specific examples of etherified melamine resins include alkyl etherified melamines such as methyl etherified melamines, ethyletherified melamines and butyl etherified melamines. Any etherified melamine resins may be used alone, or two or more may be used in combination.

Examples of commercially available melamine resins include butylated melamine resins (U-VAN 205E-60 and U-VAN 225, products of Mitsui Chemicals, Inc., SUPER BECKAMINE G840 and SUPER BECKAMINE G821, products of DIC Corp.), methylated melamine resins (SAIMEL 303, product of Nihon Cytec Industries Inc., SUMIMAL M-100 and SUMIMAL M-40S, products of Sumitomo Chemical Co., Ltd.), methyl etherified melamine resins (SAIMEL 303, SAIMEL 325, SAIMEL 327, SAIMEL 350 and SAIMEL 370, products of Nihon Cytec Industries Inc., SUMIMAL M55, product of Sumitomo Chemical Co., Ltd.), methylated/butylated mixed etherified melamine resins (SAIMEL 253, SAIMEL 202, SAIMEL 238, SAIMEL 254, SAIMEL 272 and SAIMEL 1130, products of Nihon Cytec Industries Inc., SUMIMAL M66B, product of Sumitomo Chemical Co., Ltd.), and methylated/isobutylated mixed etherified melamine resins (SAIMEL XV805, product of Nihon Cytec Industries Inc.).

The mixing proportion of the curing agent may be as appropriate so that the coating film cures and exhibits adequate performance, but from the viewpoint of curability of the coating film that is to be obtained, the hydroxyl group-containing resin/curing agent proportion is preferably in the range of 80/20 to 50/50 as mass ratio.

When a polyisocyanate compound is used in the curing agent, the mixing proportion is preferably such that the equivalent ratio of isocyanate groups of the polyisocyanate compound and hydroxyl groups of the hydroxyl group-containing resin in the coating composition of the invention (NCO/OH) is usually in the range of 0.5 to 2.0 and especially 0.7 to 1.5.

Dispersion of Acrylic Resin-Coated Silica Particles (C)

The dispersion of acrylic resin-coated silica particles (C) is an acrylic resin-coated silica particle dispersion which is the reaction product of silica particles with a polymerizable unsaturated group (c1) and a polymerizable unsaturated monomer (c2), in a mass ratio of (c1):(c2)=20:80 to 90:10, the polymerizable unsaturated monomer (c2) includes, as at least a portion of its components, the specific polymerizable unsaturated monomer (c2-1) described below, and the molecular weight of the resin covering the silica particles is 400 to 6000.

Silica Particles with Polymerizable Unsaturated Group (c1)

The silica particles with a polymerizable unsaturated group (c1) may be silica particles (c1-i) having a polymerizable unsaturated group, that can be obtained, for example, by mixing and heating the silica particles (d), an organic solvent (e) and a monomer having a polymerizable unsaturated group and a hydrolyzable silyl group (f), or it may be polymerizable unsaturated group-containing silica particles (c1-ii) obtained by adding a tertiary amine (g) to the silica particles (c1-i) having a polymerizable unsaturated group. From the viewpoint of the storage property of the coating material and the viewpoint of mar resistance of the coating film that is to be obtained, it is preferred to use (c1-ii) as the silica particles with a polymerizable unsaturated group (c1).

Silica Particles (d)

The silica particles (d) used may be any silica particles that can have their surfaces modified with polymerizable unsaturated groups, by forming covalent bonds by reaction with the monomer having a polymerizable unsaturated group and a hydrolyzable silyl group (f), as described below. Such silica particles (d) include dry silica, wet silica, silica gel, calcium ion-exchanged silica microparticles and colloidal silica, but particularly preferred is colloidal silica which consists of silica microparticles dispersed in a dispersing medium, and having hydroxyl and/or alkoxy groups on the particle surfaces.

Examples of dispersing media include water; alcohol-based solvents such as methanol, ethanol, isopropanol, n-propanol, isobutanol and n-butanol; polyhydric alcohol-based solvents such as ethylene glycol; polyhydric alcohol derivatives such as ethyleneglycol monoethyl ether, ethyleneglycol monobutyl ether and propyleneglycol monomethyl ether; and ketone-based solvents such as methyl ethyl ketone, methyl isobutyl ketone and diacetone alcohol. Preferred dispersing media are lower alcohol-based solvents and lower polyhydric alcohol derivatives with 3 or fewer carbon atoms. This is in order to facilitate removal in the solvent removal step during production of the polymerizable unsaturated group-containing silica particles (c1-i).

Examples of colloidal silica include methanol silica sol, IPA-ST, MEK-ST, NBA-ST, XBA-ST, DMAC-ST, PGM-ST, ST-UP, ST-OUP, ST-20, ST-40, ST-C, ST-N, ST-O, ST-50 and ST-OL (all by Nissan Chemical Industries, Ltd.).

The mean primary particle size of the silica particles (d) is preferably 5 to 100 nm and more preferably 5 to 50 nm. If the mean primary particle size is smaller than 5 nm, the effect of improving the mechanical and other properties may be reduced when the present dispersion is used in admixture with another organic material. If the mean primary particle size exceeds 100 nm, loss of transparency may result.

Throughout the present specification, the "mean primary particle size" means the median diameter (d50) in the volume-based particle size distribution, the volume-based particle size distribution being measured by laser diffraction/scattering. According to the invention, the volume-based particle size distribution of the present dispersion was measured using a "Microtrac NT3300" laser diffraction/scattering particle size distribution analyzer (trade name of Nikkiso Co., Ltd.). The sample concentration was adjusted for the prescribed transmittance range set by the apparatus.

Organic Solvent (e)

The organic solvent (e) is preferably a hydrophilic organic solvent, examples of hydrophilic organic solvents including alcohol-based organic solvents such as methanol, ethanol, isopropanol, n-butanol and isobutanol; ether-based organic solvents such as dioxane and tetrahydrofuran; glycol ether-based organic solvents such as ethyleneglycol monomethyl ether, ethyleneglycol monoethyl ether, ethyleneglycol mono-n-propyl ether, ethyleneglycol mono-isopropyl ether, ethyleneglycol mono-n-butyl ether, ethyleneglycol mono-isobutyl ether, ethyleneglycol mono-tert-butyl ether, diethyleneglycol monomethyl ether, diethyleneglycol monoethyl ether, diethyleneglycol mono-n-propyl ether, diethyleneglycol mono-isopropyl ether, diethyleneglycol mono-n-butyl ether, diethyleneglycol mono-isobutyl ether, diethyleneglycol mono-tert-butyl ether, propyleneglycol monomethyl ether, propyleneglycol monoethyl ether, propyleneglycol mono-n-propyl ether, propyleneglycol mono-isopropyl ether, dipropyleneglycol monomethyl ether, dipropyleneglycol monoethyl ether, dipropyleneglycol mono-n-propyl ether and dipropyleneglycol mono-isopropyl ether; and esteric organic solvents such as ethyl acetate, butyl acetate, isobutyl acetate and 3-methoxybutyl acetate; any of which may be used alone or in combinations of two or more.

Of these, alcohols and/or glycol ethers are preferred from the viewpoint of storage properties and mar resistance.

Further preferred among these, from the viewpoint of storage properties and mar resistance, are alcohols with boiling points of 64 to 132° C. and preferably boiling points of 82 to 118° C., and glycol ethers with boiling points of 120 to 208° C. and preferably boiling points of 120 to 192° C.

Yet further preferred among these, from the viewpoint of storage properties and mar resistance, are alcohols of 2 to 8 carbon atoms and preferably 3 to 5 carbon atoms, and glycol ethers of 3 to 5 carbon atoms and preferably 3 to 4 carbon atoms.

Monomer Having Polymerizable Unsaturated Group and Hydrolyzable Silyl Group (f)

The monomer having a polymerizable unsaturated group and a hydrolyzable silyl group (f) may be, for example, 3-(meth)acryloyloxypropyltrimethoxysilane, 3-(meth)acryloyloxypropyltriethoxysilane, 2-(meth)acryloyloxyethyltrimethoxysilane, 2-(meth)acryloyloxyethyltriethoxysilane, 3-(meth)acryloyloxypropylmethyldimethoxysilane, 2-(meth)acryloyloxyethylmethyldimethoxysilane, vinyltrimethoxysilane, vinyltriethoxysilane, allyltrimethoxysilane, allyltriethoxysilane, or a monomer having a polymerizable unsaturated group and a hydrolyzable silyl group obtained by reacting a functional group other than the hydrolyzable silyl group of a silane coupling agent with a functional group other than the unsaturated group of an unsaturated compound.

The polymerizable unsaturated group-containing silica particles (c1-i) can be obtained by mixing and heating the silica particles (d), the organic solvent (e) and the monomer having a polymerizable unsaturated group and a hydrolyzable silyl group (f).

More specifically, it may be produced by mixing the silica particles (d) dispersed in a dispersing medium, the organic solvent (e), and the monomer having a polymerizable unsaturated group and a hydrolyzable silyl group (f), and azeotropically distilling off the organic solvent (e) and the dispersing medium of the silica particles (d) (including any lower alcohols produced by hydrolysis of the monomer having a polymerizable unsaturated group and a hydrolyzable silyl group) at ordinary pressure or under reduced pressure, exchanging the dispersing medium with the organic solvent (e) while, or before, conducting dehydrating condensation reaction with heating.

The nonvolatile content concentration of the dispersion during the reaction is preferably in the range of about 5 to about 50 mass %. If the nonvolatile content concentration is less than about 5 mass %, i.e. if the solvent content is greater than about 95 mass %, then the reaction time between the silica particles (d) and the monomer having a polymerizable unsaturated group and a hydrolyzable silyl group (f) will be longer, potentially lowering the production efficiency. On the other hand, if the nonvolatile content concentration is greater than about 50 mass %, the product may potentially undergo gelation.

In the production method, the silicon atoms on the surfaces of the silica particles (d) and the silicon atoms of the monomer having a polymerizable unsaturated group and a hydrolyzable silyl group (f) bond via oxygen atoms forming siloxane bonds, thereby allowing a dispersion of silica particles (c1-i) having a polymerizable unsaturated group to be obtained, with chemical bonding between the silica particles (d) and the monomer having a polymerizable unsaturated group and a hydrolyzable silyl group (f).

The mixing proportion of the monomer having a polymerizable unsaturated group and a hydrolyzable silyl group (f), for obtaining the silica particles (c1-i) having a polymerizable unsaturated group, is preferably from about 0.2 part by mass to about 95 parts by mass, more preferably from about 0.5 part by mass to about 50 parts by mass, and even more preferably from about 1.0 part by mass to about 20 parts by mass, with respect to 100 parts by mass of the silica particles (d).

If the proportion of the monomer having a polymerizable unsaturated group and a hydrolyzable silyl group (f) is less than about 0.2 part by mass, the resulting silica particles (c1-i) having a polymerizable unsaturated group can potentially have poor stability in the dispersing medium. If the proportion of the monomer having a polymerizable unsaturated group and a hydrolyzable silyl group (f) is greater than about 95 parts by mass, unreacted residue of the monomer having a polymerizable unsaturated group and a hydrolyzable silyl group (f) may remain during the reaction with the silica particles (d).

In order to obtain silica particles (c1-i) having a polymerizable unsaturated group, an alkoxysilane with an alkyl group of 1 or more carbon atoms may be reacted with the silica particles (d) if necessary, together with the monomer having a polymerizable unsaturated group and a hydrolyzable silyl group (f). Reacting the alkoxysilane with an alkyl group of one or more carbon atoms may improve the water resistance of the coating film that is to be obtained. Examples of alkoxysilanes with an alkyl group of one or more carbon atoms include methyltrimethoxysilane, ethyltrimethoxysilane, propyltrimethoxysilane, butyltrimethoxysilane, hexyltrimethoxysilane, decyltrimethoxysilane and dodecyltrimethoxysilane, as well as these compounds that have the methoxy groups replaced with ethoxy groups (for example, methyltriethoxysilane).

From the viewpoint of storage stability and mar resistance, the silica particles with a polymerizable unsaturated group (c1) are preferably a dispersion of polymerizable unsaturated group-containing silica particles (c1-ii), obtained by adding a tertiary amine (g) to the dispersion of polymerizable unsaturated group-containing silica particles (c1-i) obtained from components (d), (e) and (f).

Tertiary Amine (g)

The tertiary amine (g) to be used is not particularly restricted so long as it is a tertiary amine (g) having a molecular weight of 120 to 380, preferably 130 to 350 and more preferably 150 to 300, and with a terminal alkyl and/or aryl group.

From the viewpoint of storage properties and mar resistance, the tertiary amine (g) is preferably one wherein at least one of the alkyl groups of the tertiary amine (g) is an alkyl group of 3 or more carbon atoms, preferably 4 to 12 carbon atoms and more preferably 5 to 10 carbon atoms.

Among these, from the viewpoint of storage properties and mar resistance, most preferably at least one of the alkyl groups of the tertiary amine (g) is a straight-chain alkyl group.

Examples for the tertiary amine (g) include:

straight-chain tertiary amines such as tripropylamine, tributylamine, tri-n-pentylamine, tri-n-hexylamine, tri-n-heptylamine and tri-n-octylamine;

branched tertiary amines such as branched tritridecylamines, including triisopropylamine, triisobutylamine and tri-2-ethylhexylamine;

tertiary amines with mixed hydrocarbon groups, such as dimethyloctylamine, dimethyldodecylamine, dimethyloctadecylamine, hexyldiethylamine, octyldiethylamine and diethyldodecylamine;

alicyclic tertiary amines such as dimethylcyclohexylamine and tricyclohexylamine; and tertiary amines with aromatic ring substituents, such as dimethylbenzylamine and tribenzylamine. Any one of these or a combination of two or more of these may be used.

The method of adding the tertiary amine (g) to the dispersion of polymerizable unsaturated group-containing silica particles (c1-i) may be any method that is known in the prior art.

From the viewpoint of storage stability and of the mar resistance of the coating film that is to be obtained when added to a coating material, the amount of tertiary amine (g) used is 0.1 to 5.0 parts by mass, preferably 1.5 to 3.0 parts by mass and more preferably 1.7 to 2.5 parts by mass, based on 100 parts by mass as the solid content of the polymerizable unsaturated group-containing silica particles (i).

The dispersion of polymerizable unsaturated group-containing silica particles (c1-ii) can be obtained in this manner.

The silica particles with a polymerizable unsaturated group (c1) obtained as described above are reacted with a polymerizable unsaturated monomer (c2), in a solid mass ratio of (c1):(c2)=20:80 to 90:10, to obtain a dispersion of acrylic resin-coated silica particles (C).

Polymerizable Unsaturated Monomer (c2)

The polymerizable unsaturated monomer (c2) includes a specific polymerizable unsaturated monomer (c2-1) as at least a portion of its components.

Monomer (c2-1)

The monomer (c2-1) is a polymerizable unsaturated monomer represented by the following formula (I):

[Chemical Formula 3]

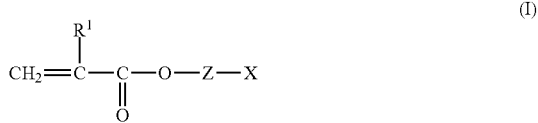

(I)

(wherein $R^1$ is a hydrogen atom or methyl group, Z represents a structure including the following formula (II), and X represents a hydrogen atom or a group selected from among (meth)acryloyl, alkyl, hydroxyl, amino and aryl groups);

[Chemical Formula 4]

(II)

(wherein m represents an integer of 5 to 200, $R^2$ represent phenyl groups or alkyl groups of 1 to 6 carbon atoms, that may be the same or different, and $R^3$ represents an alkylene group of 1 to 6 carbon atoms).

In formula (I), X represents a hydrogen atom or a group selected from among (meth)acryloyl, alkyl, hydroxyl, amino, (alicyclic) epoxy, carboxyl, mercapto, vinyl, isocyanate and aryl groups, but is preferably a group selected from among (meth)acryloyl and alkyl groups, and more preferably it is a group selected from among (meth)acryloyl groups and alkyl groups of 1 to 10 carbon atoms.

In formula (II), m represents an integer of 5.5 to 160, but it is preferably an integer of 12 to 106 and more preferably 23 to 64.

Also in formula (II), $R^2$ represent phenyl groups or alkyl groups of 1 to 6 carbon atoms, which may be the same or different, but preferably they represent alkyl groups of 1 to 3 carbon atoms, and more preferably methyl groups.

Also in formula (II), $R^3$ represents an alkylene group of 1 to 6 carbon atoms, but preferably it is an alkylene group of 1 to 3 carbon atoms, and more preferably a methylene group.

The proportion of the monomer (c2-1) in the polymerizable unsaturated monomer (c2) is 0.01 to 15 mass %, preferably 0.05 to 5 mass % and more preferably 0.1 to 3 mass %, based on the total mass of the polymerizable unsaturated monomer.

Monomer (c2-2)

The monomer (c2-2) is a compound having at least one polymerizable unsaturated group in the molecule, and it is a monomer other than (c2-1). Specific examples are listed below.

(1) Hydroxyl group-containing polymerizable unsaturated monomers: Hydroxyl group-containing polymerizable unsaturated monomers are compounds having at least one hydroxyl group and at least one polymerizable unsaturated group in the molecule, and specifically, a hydroxyl group-containing polymerizable unsaturated monomer is preferably a monoester of acrylic acid or methacrylic acid and a dihydric alcohol of 2 to 10 carbon atoms, examples of which include hydroxyalkyl (meth)acrylates such as 2-hydroxyethyl (meth)acrylate, 2-hydroxypropyl (meth)acrylate, 3-hydroxypropyl (meth)acrylate and 4-hydroxybutyl (meth)acrylate. As the hydroxyl group-containing polymerizable unsaturated monomer (c2-2) there may also be mentioned ring-opening polymerization addition products of the aforementioned hydroxyalkyl (meth)acrylates and lactones such as ε-caprolactone. Specific examples include "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4" and "PLACCEL FM-5" (all trade names of Dicel Chemical Industries, Ltd.).

(2) Polymerizable unsaturated monomers with alicyclic hydrocarbon groups: Polymerizable unsaturated monomers with alicyclic hydrocarbon groups may be cyclohexyl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate, tetrahydrofurfuryl (meth)acrylate, or the like.

(3) Acid group-containing polymerizable unsaturated monomers: Compounds having at least one acid group and one unsaturated bond in the molecule, examples of which include carboxyl group-containing polymerizable unsaturated monomers such as (meth)acrylic acid, crotonic acid, itaconic acid, maleic acid and maleic anhydride; sulfonic acid group-containing polymerizable unsaturated monomers such as vinylsulfonic acid and sulfoethyl (meth)acrylate; and acidic phosphoric acid ester-based polymerizable unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-methacroyloxyethylphenylphosphoric acid.

(4) Monoesters of (meth)acrylic acid and monohydric alcohols of 1 to 20 carbon atoms; Examples include methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, isostearyl acrylate (trade name of Osaka Organic Chemical Industry, Ltd.), lauryl (meth)acrylate, tridecyl (meth)acrylate and stearyl (meth)acrylate.

(5) Alkoxysilyl group-containing polymerizable unsaturated monomers: Examples include vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane and vinyltris(β-methoxyethoxy)silane.

(6) Aromatic polymerizable unsaturated monomers: Examples include styrene, α-methylstyrene and vinyltoluene.

(7) Glycidyl group-containing polymerizable unsaturated monomers: Compounds having one glycidyl group and one unsaturated bond in the molecule, specific examples including glycidyl acrylate and glycidyl methacrylate.

(8) Nitrogen-containing polymerizable unsaturated monomers: Examples include (meth)acrylamide, dimethylacrylamide, N,N-dimethylpropylacrylamide, N-butoxymethylacrylamide, N-methylolacrylamide, N-methylolmethacrylamide, diacetoneacrylamide, N,N-dimethylaminoethyl (meth)acrylate, vinylpyridine and vinylimidazole.

(9) Other vinyl compounds: Examples include vinyl acetate, vinyl propionate, vinyl chloride and the vinyl versatate esters "VEOVA 9" and "VEOVA 10" (trade names of Japan Chemtech, Ltd.).

(10) Unsaturated bond-containing nitrile-based compounds: Examples include acrylonitrile and methyacrylonitrile.

The polymerizable unsaturated monomer (c2-2) may be used alone or as a combination of two or more.

Throughout the present specification, the term "polymerizable unsaturated group" means an unsaturated group that can participate in radical polymerization. Examples of such polymerizable unsaturated groups include vinyl and (meth)acryloyl.

Also throughout the present specification, "(meth)acrylate" means "acrylate or methacrylate". The term "(meth)acrylic acid" means "acrylic acid or methacrylic acid". The term "(meth)acryloyl" means "acryloyl or methacryloyl". The term "(meth)acrylamide" means "acrylamide or methacrylamide".

From the viewpoint of mar resistance of the coating film that is to be obtained, the polymerizable unsaturated monomer (c2-2) preferably includes the hydroxyl group-containing polymerizable unsaturated monomer (1) as at least a portion thereof. Particularly from the viewpoint of mar resistance of the coating film that is to be formed, it is preferred to use a hydroxyl group-containing polymerizable unsaturated monomer with a hydroxyl group-containing hydrocarbon group of 4 or more carbon atoms, and especially 4-hydroxybutyl (meth)acrylate. When the polymerizable unsaturated monomer (c2-2) includes the hydroxyl group-containing polymerizable unsaturated monomer (1) as at least a portion thereof, the amount is preferably 10 to 50 mass %, more preferably 20 to 45 mass % and even more preferably 25 to 40 mass %, based on the polymerizable unsaturated monomer (c2-2).

From the viewpoint of mar resistance, acid resistance, stain resistance and outer appearance of the coating film that is to be formed, the polymerizable unsaturated monomer (c2-2) preferably includes the polymerizable unsaturated monomer with an alicyclic hydrocarbon group (2) as at least a portion thereof. More specifically, from the viewpoint of acid resistance and stain resistance, it preferably includes cyclohexyl (meth)acrylate and isobornyl (meth)acrylate. When the polymerizable unsaturated monomer (c2-2) includes the polymerizable unsaturated monomer with an alicyclic hydrocarbon group (2) as at least a portion thereof, the amount is preferably 5 to 60 mass %, more preferably 10 to 55 mass % and even more preferably 20 to 50 mass %, based on the polymerizable unsaturated monomer (c2-2).

From the viewpoint of mar resistance, acid resistance, stain resistance and outer appearance of the coating film that is to be formed, the polymerizable unsaturated monomer (c2-2) preferably includes the aromatic polymerizable unsaturated monomer (6) as at least a portion thereof. More specifically, from the viewpoint of acid resistance and stain resistance, it preferably includes styrene. When the polymerizable unsaturated monomer (c2-2) includes the aromatic polymerizable unsaturated monomer (6) as at least a portion thereof, the amount is preferably 5 to 40 mass %, more preferably 10 to 30 mass % and even more preferably 15 to 25 mass %, based on the polymerizable unsaturated monomer (c2-2).

Method for Producing Dispersion of Acrylic Resin-Coated Silica Particles (C)

The dispersion of acrylic resin-coated silica particles (C) can be obtained by polymerization reaction of the silica particles with a polymerizable unsaturated group (c1) and the polymerizable unsaturated monomer (c2), in the presence of a solvent. The polymerization method is not particularly restricted and any publicly known polymerization method may be used, but it is preferred to use a solution polymerization method in which polymerization is conducted in an organic solvent, in the presence of an appropriate catalyst and polymerization initiator.

Examples of organic solvents to be used in the solution polymerization method include aromatic compounds such as benzene, toluene, xylene, ethylbenzene, "SWASOL 1000" and "SWASOL 1500" (trade names of Maruzen Petrochemical Co., Ltd., high-boiling-point petroleum-based solvents), hydrocarbon-based solvents such as pentane, hexane, heptane, octane, cyclohexane, cycloheptane and mineral spirits; halogenated hydrocarbons such as trichlorethylene and tetrachlorethylene; ester-based solvents such as ethyl acetate, n-butyl acetate, isobutyl acetate, ethyl propionate, methylcellosolve acetate, butylcarbitol acetate, ethyleneglycol monomethyl ether acetate, diethyleneglycol monobutyl ether acetate and 3-ethoxyethyl propionate; ketone-based solvents such as methyl ethyl ketone, methyl isobutyl ketone, diisobutyl ketone and cyclohexanone; alcohol-based solvents such as methanol, ethanol, isopropanol, n-butanol, sec-butanol, isobutanol, ethylene glycol, ethyleneglycol monomethyl ether, ethyleneglycol monoethyl ether and ethyleneglycol monobutyl ether; ether-based solvents such as n-butyl ether, dioxane, dibutyl ether and ethyleneglycol dimethyl ether; and dimethyl sulfoxide, dimethylformamide, N-methylpyrrolidone or water. Any of these organic solvents may be used alone or in combinations of two or more. Of those mentioned, aromatic solvents and esteric solvents are preferred, and ester-based solvents are more preferred, from the viewpoint of the outer appearance of the formed coating film.

The polymerization initiator to be used for polymerization is not particularly restricted, and examples include known radical polymerization initiators, among which are peroxide-based polymerization initiators such as benzoyl peroxide, para-menthane hydroperoxide, cumene hydroperoxide, lauroyl peroxide, cyclohexanone peroxide, 3,3,5-trimethylcyclohexanone peroxide, methylcyclohexanone peroxide, tert-butyl peroxypivalate, 1,1'-bis(tert-butylperoxy)cyclohexane, 1,1-bis(tert-butylperoxy)-3,3,5-trimethylcyclohexane, n-butyl-4,4-bis(tert-butylperoxy) valerate, 2,2'-di(tert-butylperoxy)butane, tert-butylhydroxy peroxide, 2,5-dimethylhexane-2,5-dihydroperoxide, di-tert-butyl peroxide, di-n-propyl peroxydicarbonate, tert-hexylperoxy-2-ethyl hexanoate, 1,3-bis(tert-butylperoxy-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxy dicarbonate, tert-butyl peroxybenzoate, 2,5-dimethyl-2,5-di(benzoylperoxy)hexane and hydrogen peroxide; azo-based polymerization initiators such as 1,1-azobis(cyclohexane-1-carbonitrile), azocumene, 2,2'-azobis-(2,4-dimethylvaleronitrile), 2,2'-azobis(2-methylbutyronitrile), 2,2'-azobisisobutyronitrile, 2,2'-azobis-(4-methoxy-2,4-dimethylvaleronitrile, dimethyl 2,2'-azobis(2-methyl propionate), 2,2'-di(2-hydroxyethyl)azobisisobutyronitrile, 4,4'-azobis(4-cyanovaleric acid), 2-(tert-butylazo)-2-cyanopropane, 2,2'-azobis(2, 4,4-trimethylpentane), 2,2'-azobis(2-methylpropane), dimethyl 2,2'-azobis(2-methyl propionate) and 2,2'-azobis-(N-butyl-2-methylpropionamide); persulfuric acid-based initiators such as potassium persulfate and sodium persulfate; and redox-based initiators comprising peroxides and reducing agents.

The amount of radical polymerization initiator used may be 0.1 to 20 parts by mass and preferably 1 to 10 parts by mass, with respect to 100 parts by mass of the polymerizable unsaturated monomer (c2). If the amount of the radical polymerization initiator is less than 0.1 part by mass, the proportion of unreacted polymerizable unsaturated monomer (c2) that does not react with the silica particles with a polymerizable unsaturated group (c1) will potentially increase. If the amount of the radical polymerization initiator is greater than 20 parts by mass, aggregation of the particles may occur due to polymerization between the acrylic resin-coated silica particles. The acrylic resin-coated silica particles may also include unreacted polymerizable unsaturated monomer (c2), or polymer that has resulted from reaction between the polymerizable unsaturated monomer (c2), but that has not reacted with the silica particles with a polymerizable unsaturated group (c1).

The blending ratio of the dispersion of the silica particles with a polymerizable unsaturated group (c1) and the polymerizable unsaturated monomer (c2) is in the range of (c1): (c2)=20:80 to 90:10, preferably 30:70 to 80:20 and more preferably 40:60 to 60:40, as the solid mass ratio, from the viewpoint of the outer appearance of the formed coating film.

When the reaction between the silica particles with a polymerizable unsaturated group (c1) and the polymerizable unsaturated monomer (c2) is to be carried out in a solvent, the total mass concentration of the silica particles with a polymerizable unsaturated group (c1) and the polymerizable unsaturated monomer (c2) is preferably in the range of about 10 mass % to about 90 mass %, and especially about 20 mass % to about 70 mass %. If the total mass concentration is less than about 10 mass %, the reaction time will be longer and the production efficiency may be reduced. If the total mass concentration is higher than about 90 mass %, the viscosity of the reaction system will increase, and stirring may become difficult.

From the viewpoint of minimizing inhibition of the polymerization reaction by oxygen and increasing the reaction rate, the reaction is preferably carried out while exchanging the gas phase in the reactor with an inert gas and agitating. The reaction temperature and reaction time can be appropriately selected depending on the type of polymerizable unsaturated monomer (c2), but preferably the reaction temperature is in the range of about 0° C. to about 250° C. and the reaction time is in the range of 1 to 72 hours. The reaction will usually be carried out under ordinary pressure, but it may instead by carried out either under pressurization or under reduced pressure.

The polymerization rate of the polymerizable unsaturated monomer (c2) for the reaction is preferably about 90% or higher or about 95% or higher. If the polymerization rate of the polymerizable unsaturated monomer (c2) is lower than about 90% the film performance such as mar resistance may be inferior, and when the obtained dispersion of acrylic resin-coated silica particles (C) is used, a problem of odor due to the unreacted polymerizable unsaturated monomer (c2) may be encountered. The amount of unreacted polymerizable unsaturated monomer (c2) can be reduced by extending the reaction time. When the amount of unreacted polymerizable unsaturated monomer (c2) is low, it can be reduced by adding a radical polymerization initiator and conducting further polymerization reaction. The obtained dispersion of acrylic resin-coated silica particles (C) may optionally have its solvent exchanged with another solvent such as water.

From the viewpoint of storage stability of the coating material and mar resistance of the coating film that is to be obtained, the molecular weight of the resin covering the silica particles is 400 to 6000, preferably 1000 to 5500 and more preferably 3000 to 5000.

The hydroxyl value of the resin covering the silica particles in the dispersion of acrylic resin-coated silica particles (C) that is obtained by the aforementioned production method is preferably in the range of 50 to 200 mgKOH/g, especially 70 to 200 mgKOH/g and most especially 100 to 200 mgKOH/g, from the viewpoint of the mar resistance of the formed coating film.

In addition, the glass transition temperature Tg of the resin covering the silica particles in the dispersion of acrylic resin-coated silica particles (C) obtained by the production method is preferably in the range of −40 to 40° C., and more preferably in the range of −30 to 30° C., from the viewpoint of the mar resistance of the formed coating film.

According to the invention, the glass transition temperature Tg is the value calculated by the following formula.

$$1/Tg(K)=W1/T1+W2/T2+\ldots Wn/Tn$$

$$Tg(° C.)=Tg(K)-273$$

In this formula, W1, W2, . . . Wn represents the mass fraction of each of the monomers, and T1, T2 . . . Tn represents the glass transition temperature Tg (K) of homopolymers of each of the monomers.

The glass transition temperature of the homopolymer of each monomer is the value according to POLYMER HANDBOOK Fourth Edition, J. Brandrup, E. H. Immergut, E. A. Grulke, ed. (1999), and the glass transition temperatures of monomers not listed in this publication are the values measured by synthesizing a homopolymer of the monomer to a weight-average molecular weight of about 50,000, and determining the glass transition temperature with a DSC220U by Seiko Instruments, Inc. (differential scanning calorimeter). The measurement was conducted by weighing out 50 mg of sample into a special sample dish and drying it at 130° C. for 3 hours, and then raising the temperature from −50° C. to 150° C. at a speed of 10° C./min in an inert gas and reading out the temperature at the point of inflection of the obtained heat change curve.

The content of the dispersion of acrylic resin-coated silica particles (C) in the present coating material may be in the range of 0.1 to 25 mass %, preferably 0.5 to 20 mass % and more preferably 1 to 15 mass %, based on the total solid content of the hydroxyl group-containing resin (A) and the curing agent (B).

Other Components

The present coating material may further contain common coating material additives such as curing catalysts, pigments, ultraviolet absorbers (for example, benzotriazole-based absorbers, triazine-based absorbers, salicylic acid derivative-based absorbers and benzophenone-based absorbers), light stabilizers (for example, hindered piperidines), thickening agents, antifoaming agents, plasticizers, organic solvents, surface control agents and anti-settling agents, either alone or in combinations of two or more.

Examples of curing catalysts include organometallic catalysts such as tin octylate, dibutyltin di(2-ethyl hexanoate), dioctyltin di(2-ethyl hexanoate), dioctyltin diacetate, dibutyltin dilaurate, dibutyltin oxide, dioctyltin oxide and lead 2-ethylhexanoate, and tertiary amines. Any of these may be used alone or in combinations of two or more.

When the present coating material contains a curing catalyst, the curing catalyst content is preferably in the range of 0.05 to 10 parts by mass, more preferably in the range of 0.1 to 5 parts by mass and even more preferably in the range of 0.2 to 3 parts by mass, based on 100 parts by mass as the total solid resin content of the hydroxyl group-containing resin (A) and the curing agent (B).

When the present coating material contains an ultraviolet absorber, the ultraviolet absorber content is preferably in the range of 0.1 to 10 parts by mass, more preferably in the range of 0.2 to 5 parts by mass and even more preferably in the range of 0.3 to 2 parts by mass, based on 100 parts by mass as the total solid resin content of the hydroxyl group-containing resin (A) and the curing agent (B).

When the present coating material contains a light stabilizer, the light stabilizer content is preferably in the range of 0.1 to 10 parts by mass, more preferably in the range of 0.2 to 5 parts by mass and even more preferably in the range of 0.3 to 2 parts by mass, based on 100 parts by mass as the total solid resin content of the hydroxyl group-containing resin (A) and the curing agent (B).

The present coating material may be a one-pack type coating material, or a multi-pack coating material such as a two-pack resin coating material. When a non-blocked polyisocyanate compound is used as the curing agent in the present coating material, from the viewpoint of storage stability, it is preferred to use a two-pack coating material containing a base compound including the hydroxyl group-containing resin, and the curing agent, the two being mixed just prior to use.

The form of the present coating material is not particularly restricted, but is preferably an organic solvent solution or nonaqueous dispersion form.

Examples of organic solvents include ketones such as acetone, methyl ethyl ketone and methyl isobutyl ketone; esters such as ethyl acetate, butyl acetate, methyl benzoate, ethoxyethyl propionate, ethyl propionate and methyl propionate; ethers such as tetrahydrofuran, dioxane and dimethoxyethane; glycol ethers such as ethyleneglycol monomethyl ether, ethyleneglycol monoethyl ether, diethyleneglycol monomethyl ether, propyleneglycol monomethyl ether acetate and 3-methoxybutyl acetate; aromatic hydrocarbons, aliphatic hydrocarbons, and the like.

These may be used in appropriate combinations, depending on the purpose of adjusting the viscosity or adjusting the coatability.

The solid content of the present coating material is not particularly restricted. For example, from the viewpoint of smoothness of the cured coating film and shortening the drying time, it is preferred to carry out appropriate adjustment using a solvent such as an organic solvent, so that the viscosity is in the range of 15 to 60 seconds as measured with a Ford cup No. 4 at 20° C.

Throughout the present specification, "solid content" means the residue remaining after removing the volatile components, although the residue may be in either solid form or liquid form at ordinary temperature. The solid mass can be calculated by defining the solid content as the proportion of the residue mass when dried with respect to the mass before drying, and multiplying the solid content by the sample mass before drying.

Coating Method

There are no particular restrictions on the article to be coated, on which the present coating material is to be applied. Examples include metal base materials, for example, steel sheets such as cold-rolled steel sheets, galvanized steel sheets, zinc alloy-plated steel sheets, stainless steel plates or tin plated steel sheets, or aluminum sheets or aluminum alloy sheets; or various types of plastic materials. The article may also be a vehicle body, of any of various types of vehicles such as automobiles, two-wheel vehicles or containers, formed of such materials.

The article to be coated may also be an article that is a metal base material or has a metal surface such as a car body formed thereof, and that has been surface-treated by phosphate treatment, chromate treatment or complex oxide treatment. The article to be coated may be one having an undercoat film such as an electrodeposition coating formed, or one having an undercoat film and intercoating film formed, or one having an undercoat film, an intercoating film and a base coating film formed, or one having an undercoat film, intercoating film, base coating film and clear coating film formed, on any of the metal base materials or car bodies mentioned above.

The method of applying the present coating material is not particularly restricted, and for example, there may be mentioned air spray coating, airless spray coating, rotary atomizing coating, curtain coating or the like, which methods allow formation of wet coating films. An electrostatic charge may also be applied if necessary in these coating methods. Air spray coating and rotary atomizing coating are especially preferred among these.

The coating amount of the present coating material is usually preferred to be an amount for a cured film thickness of about 10 to 50 μm.

When carrying out air spray coating, airless spray coating or rotary atomizing coating, the viscosity of the present coating material is preferably adjusted as appropriate using an organic solvent or other solvent to within a suitable viscosity range for coating, and usually to a viscosity range of about 15-60 seconds at 20° C. as measured with a Ford cup No. 4 viscometer.

The wet coating film obtained by coating the present coating material onto the article to be coated is hardened by heating, which may be accomplished using known heating means with a drying furnace such as, for example, an air heating furnace, electric furnace, infrared induction heating furnace or the like. The heating temperature may be in the range of 60 to 180° C., and preferably 90 to 150° C. The heating time is not particularly restricted, but is preferably in the range of 10 to 60 minutes and more preferably 15 to 30 minutes.

Because the present coating material can produce a hardened coating film with excellent mar resistance and an excellent coating film appearance, it can be suitably used as an overcoat top clear coating material composition. The present coating material is particularly suitable as a coating material for an automobile.

Multilayer Coating Film-Forming Method

The multilayer coating film-forming method, by which the present coating material is applied as an overcoat top clear coating material, may be a multilayer coating film-forming method in which at least one colored base coating material and at least one clear coating material are applied in that order on the article to be coated, or a multilayer coating film-forming method in which the coating composition of the invention is applied as the uppermost clear coating material.

A specific example is a "two-coat, one-bake" type multilayer coating film-forming method in which, for example, a solvent-type or aqueous base coat material is applied onto an article to be coated that has an electrodeposition and/or intercoat coating material formed on it, if necessary with preheating at 40 to 90° C. for about 3 to 30 minutes, for example, to promote volatilization of the solvent in the base coat material, without hardening the coating film, and the present coating material is applied as a clear coating material onto the uncured base coating film, after which the base coat and clear coat are hardened together.

The present coating material is preferably used as the top clear coating material for a finish coating in a "three-coat, two-bake" system or a "three-coat, one-bake" system.

The base coat material to be used may be a thermosetting base coat material that is commonly known in the prior art, and specifically, a curing agent such as an amino resin, polyisocyanate compound or blocked polyisocyanate compound may be used in combination with a base resin such as an acrylic resin, polyester resin, alkyd resin or urethane resin, as appropriate for the reactive functional groups of the base resin, and a color pigment or brightness pigment may be further added, for use as the coating material.

Examples of base coat materials to be used include aqueous coating materials, organic solvent-based coating materials and powder coating materials.

When using two or more clear coats in a multilayer coating film-forming method, the clear coating material other than that of the uppermost layer may be any common thermosetting clear coating material known in the prior art.

EXAMPLES

The present invention will now be explained in greater detail using production examples, examples and comparative examples. However, the invention is in no way limited by the examples. Throughout the examples, the "parts" and "%" values are based on mass, unless otherwise specified. Also, the film thicknesses of the coating films are based on the cured coating films.

Production of Hydroxyl Group-Containing Resin
(A)

Production Example 1

After charging 31 parts of 3-ethoxyethyl propionate into a four-necked flask equipped with a stirrer, thermometer, condenser tube and nitrogen gas inlet, the temperature was raised to 155° C. under a nitrogen gas stream. When the temperature reached 155° C., the nitrogen gas stream was interrupted and a monomer mixture having a composition comprising the monomers and polymerization initiators listed below was added dropwise over a period of 4 hours.

| 2-Hydroxypropyl acrylate | 24.0 parts |
|---|---|
| Styrene | 20.0 parts |
| Isobornyl acrylate | 20.8 parts |
| 2-Ethylhexyl acrylate | 34.2 parts |
| Acrylic acid | 1.0 part, and |
| di-tert-Amyl peroxide | 4.0 parts. |

Next, after ageing for 2 hours while streaming nitrogen gas at 155° C., the mixture was cooled to 100° C. and diluted with 32.5 parts of butyl acetate to obtain a solution of a hydroxyl group-containing acrylic resin (A-1) with a solid content of 60%. Also, the weight-average molecular weight of the copolymer was 13,000, the hydroxyl value was 103 mgKOH/g and the glass transition temperature was −11.0° C.

Production of Silica Particles with a Polymerizable Unsaturated Group (c1)

After placing 333 parts of PGM-ST (trade name of Nissan Chemical Industries, Ltd., silica mean primary particle size: 15 nm, silica concentration: 30 mass %, dispersing medium: propyleneglycol monomethyl ether) (100 parts as solid content) and 10 parts of deionized water in a separable flask equipped with a reflux condenser, thermometer and stirrer, 10 parts of KBM-503 (trade name of Shin-Etsu Chemical Co., Ltd., γ-methacryloyloxypropyltrimethoxysilane) was added, and dehydrating condensation reaction was conducted while stirring at 80° C. for 2 hours, after which 0.03 part of tetra-n-butylammonium fluoride was added and reaction was conducted while stirring for 1 hour. Upon completion of the reaction, 30 parts of propyleneglycol monomethyl ether was added, and then the volatile components were distilled off in a reduced pressure state, to obtain a dispersion of polymerizable unsaturated group-containing silica particles, having a solid content of 40% for the surface-modified silica particles. Trioctylamine in a proportion of 1.9 parts was mixed and stirred with 250 parts of the dispersion of polymerizable unsaturated group-containing silica particles (100 parts solid content), to obtain a dispersion of polymerizable unsaturated group-containing silica particles (c1) with a solid content of 40%.

Production of Dispersion of Acrylic Resin-Coated Silica Particles (C)

Production Example 2

Next, 135 parts of propyleneglycol monomethyl ether was charged into a separable flask equipped with a reflux condenser, thermometer, stirrer and nitrogen gas inlet, and the temperature was raised to 100° C. under a nitrogen gas stream. After reaching 100° C., a mixture of 250 parts of the dispersion of polymerizable unsaturated group-containing silica particles (c1) (100 parts solid content), 2 parts of "X-22-164AS" (trade name of Shin-Etsu Chemical Co., Ltd., $R^1$ group in formula (I): methyl, X group in formula (I): methacryl, $R^2$ group in formula (II): methyl, m in formula (II): 12), 20 parts of styrene, 35.5 parts of 4-hydroxybutyl acrylate, 41.5 parts of isobornyl acrylate, 1 part of acrylic acid and 2.5 parts of 2,2 azobis(2-methylbutyronitrile) (trade name: V-59, by Wako Pure Chemical Industries, Ltd.) was added dropwise over a period of 2 hours. After then ageing the mixture at 100° C. for 1 hour, a mixed solution of 0.83 part of V-59 and 20 parts of propyleneglycol monomethyl ether was added dropwise over a period of 0.5 hours, and ageing was continued for 2 hours. The polymerization rate was 99% as determined from the nonvolatile content. Next, ethoxyethyl propionate was added and the solvent was exchanged by azeotropic distillation in a reduced pressure state, to obtain a dispersion of acrylic resin-coated silica particles (C-1) having a measured nonvolatile content of 40%.

Production Examples 3 to 16

Dispersions of acrylic resin-coated silica particles (C-2) to (C-15) were obtained in the same manner as Production Example 2, except for using the compositions listed in Table 1.

TABLE 1

| Production Example No. | | | 2 | 3 | 4 | 5 | 6 | 7 | 8 | 9 |
|---|---|---|---|---|---|---|---|---|---|---|
| Acrylic resin-coated silica particle (C) dispersion | | | C-1 | C-2 | C-3 | C-4 | C-5 | C-6 | C-7 | C-8 |
| Silica particles with polymerizable unsaturated group (c1) | | | 100 | 100 | 100 | 100 | 100 | 50 | 170 | 100 |
| Polymerizable unsaturated monomer (c2) | (c2-1) | X-22-164AS | 2 | | | | | 2 | 2 | 2 |
| | | X-22-164B | | 2 | | | | | | |
| | | X-22-164E | | | 2 | | | | | |
| | | X-22-2404 | | | | 2 | | | | |
| | | KF-2012 | | | | | 2 | | | |
| | | X-22-164 | | | | | | | | |
| | | X-22-2426 | | | | | | | | |
| | Styrene | | 20 | 20 | 20 | 20 | 20 | 20 | 20 | 20 |
| | Isobornyl acrylate | | 41.5 | 41.5 | 41.5 | 41.5 | 41.5 | 41.5 | 41.5 | 41.5 |
| | 4-Hydroxybutyl acrylate | | 35.5 | 35.5 | 35.5 | 35.5 | 35.5 | 35.5 | 35.5 | 35.5 |
| | Acrylic acid | | 1 | 1 | 1 | 1 | 1 | 1 | 1 | 1 |
| Initiator | 2,2 azobis(2-Methylbutyronitrile) | | 2.5 | 2.5 | 2.5 | 2.5 | 2.5 | 2.5 | 2.5 | 10 |
| (c1):(c2) | | | 50:50 | 50:50 | 50:50 | 50:50 | 50:50 | 25:75 | 85:15 | 50:50 |
| Number-average molecular weight of resin covering silica particles | | | 5000 | 5000 | 5000 | 5000 | 5000 | 5000 | 5000 | 450 |

TABLE 1-continued

| Production Example No. | | | 10 | 11 | 12 | 13 | 14 | 15 | 16 |
|---|---|---|---|---|---|---|---|---|---|
| Acrylic resin-coated silica particle (C) dispersion | | | C-9 | C-10 | C-11 | C-12 | C-13 | C-14 | C-15 |
| Silica particles with polymerizable unsaturated group (c1) | | | 100 | 30 | 190 | 100 | 100 | 100 | 100 |
| Polymerizable unsaturated monomer (c2) | (c2-1) | X-22-164AS | 2 | 2 | 2 | 2 | 2 | | |
| | | X-22-164B | | | | | | | |
| | | X-22-164E | | | | | | | |
| | | X-22-2404 | | | | | | | |
| | | KF-2012 | | | | | | | |
| | | X-22-164 | | | | | | 2 | |
| | | X-22-2426 | | | | | | | 2 |
| | | Styrene | 20 | 20 | 20 | 20 | 20 | 20 | 20 |
| | | Isobornyl acrylate | 41.5 | 41.5 | 41.5 | 41.5 | 41.5 | 41.5 | 41.5 |
| | | 4-Hydroxybutyl acrylate | 35.5 | 35.5 | 35.5 | 35.5 | 35.5 | 35.5 | 35.5 |
| | | Acrylic acid | 1 | 1 | 1 | 1 | 1 | 1 | 1 |
| Initiator | | 2,2 azobis(2-Methylbutyronitrile) | 2 | 2.5 | 2.5 | 15 | 0.5 | 2.5 | 2.5 |
| | | (c1):(c2) | 50:50 | 15:85 | 95:5 | 50:50 | 50:50 | 50:50 | 50:50 |
| Number-average molecular weight of resin covering silica particles | | | 5500 | 5000 | 5000 | 300 | 8700 | 5000 | 5000 |

The components (c2-1) in the table are as follows.

"X-22-164B": Trade name of Shin-Etsu Chemical Co., Ltd., $R^1$ group in formula (I): methyl, X group in formula (I): methacryl, $R^2$ group in formula (II): methyl, $R^3$ group in formula (II), alkylene, m in formula (II): 44, "X-22-164E": Trade name of Shin-Etsu Chemical Co., Ltd., $R^1$ group in formula (I): methyl, X group in formula (I): methacryl, $R^2$ group in formula (II): methyl, $R^3$ group in formula (II), alkylene, m in formula (II): 105, "X-22-2404": Trade name of Shin-Etsu Chemical Co., Ltd., $R^1$ group in formula (I): methyl, X group in formula (I): alkyl, $R^2$ group in formula (II): methyl, $R^3$ group in formula (II), alkylene, m in formula (II): 6, "KF-2012": Trade name of Shin-Etsu Chemical Co., Ltd., $R^1$ group in formula (I): methyl, X group in formula (I): alkyl, $R^2$ group in formula (II): methyl, $R^3$ group in formula (II), alkylene, m in formula (II): 62, "X-22-164": Trade name of Shin-Etsu Chemical Co., Ltd., $R^1$ group in formula (I): methyl, X group in formula (I): methacryl, $R^2$ group in formula (II): methyl, $R^3$ group in formula (II), alkylene, m in formula (II): 5, "X-22-2426": Trade name of Shin-Etsu Chemical Co., Ltd., $R^1$ group in formula (I): methyl, X group in formula (I): alkyl, $R^2$ group in formula (II): methyl, $R^3$ group in formula (II), alkylene, m in formula (II): 162.

Production of Coating Composition

Example 1

A mixture of 25 parts of a dispersion of acrylic resin-coated silica particles (C-1) (10 parts solid content), 138 parts of the hydroxyl group-containing acrylic resin (A-1) obtained in Production Example 1 (83 parts solid content) and 17 parts of SUMIDUR N3300 (trade name of Sumitomo Bayer Urethane Co., Ltd., isocyanurate ring addition product of hexamethylene diisocyanate, solid content: 100%) (17 parts solid content) was diluted with 3-ethoxyethyl propionate to a coating material solid content of 40% and stirred to obtain coating composition No. 1.

Examples 2 to 9 and Comparative Examples 1 to 6

Coating compositions No. 2 to 15 were obtained in the same manner as Example 1, except that the resin-coated silica particle dispersions (C-2) to (C-15) were substituted for the acrylic resin-coated silica particle dispersion (C-1) in Example 1, as listed in Table 2.

Fabrication of Test Sheets

The viscosity of each of coating compositions No. 1 to 15 was adjusted to a viscosity of 25 seconds at 20° C. using a Ford cup #No. 4, by addition of butyl acetate, to fabricate test sheets in the following manner.

A 0.8 mm-thick dull steel sheet chemically treated with zinc phosphate was electrodeposited with ELECRON GT-10 (thermosetting epoxy resin-based cationic electrodeposition coating, trade name of Kansai Paint Co., Ltd.) to a film thickness of 20 μm and heated at 170° C. for 30 minutes to hardening, and then AMYLAC TP-65-2 (polyester/melamine resin-based automobile intercoat paint, trade name of Kansai Paint Co., Ltd.) was air spray coated over it to a film thickness of 35 μm and heated at 140° C. for 30 minutes for hardening. The solvent base coat NEOAMYLAC US-300(C) No. 202 (product of Kansai Paint Co., Ltd., acrylic/melamine resin-based automobile overcoating base coat paint, black color) was applied onto the coating film to a film thickness of 15 μm and allowed to stand at room temperature for 5 minutes, after which it was hardened by heating at 140° C. for 30 minutes. Next, the cured coating film was coated with the different coating compositions that had been produced and viscosity-adjusted in the examples and comparative examples, each to a film thickness of 35 μm, and allowed to stand at room temperature for 10 minutes, after which they were hardened by heating at 140° C. for 20 minutes, to obtain test sheets. Each of the obtained test sheets was allowed to stand at ordinary temperature for 7 days and then subjected to the following film performance test.

Performance Test

Storage Stability of Coating Composition

The coating compositions (1) to (15) obtained in the examples were evaluated for the rate of change of viscosity (sec) immediately after production, as measured with a Ford cup No. 4, and viscosity (sec) after standing for 1 week at 40° C. The evaluations of G and F were acceptable, and P was unacceptable.

Rate of change (%)=[viscosity after 1 week at 40° C. (sec)/viscosity immediately after production (sec)]×100

G: ≤5%
F: 5% to <10%
P: ≥10%

Mar Resistance of Coating Film in Car Washing

Each of the obtained test sheets was fixed to the test bench of a car washing tester (Car-wash Lab Apparatus, product of Amtec) in an atmosphere of 20° C., and a test solution comprising a mixture of 1.5 g of Sikron SH200 (trade name of Quarzwerke Co., silica microparticles with 24 μm particle diameters) in 1 liter of water was sprayed onto each test sheet while rotating a car wash brush at 127 rpm and passing the test bench through for 10 passes. Rinsing and drying were then carried out, and the 20° gloss before and after the test was measured using a gloss meter (Micro Tri Gross by Byk-Gardner), calculating the gloss retention by the following formula. An evaluation of G was acceptable, and F and P were unacceptable.

[Gloss after test/initial gloss]×100

G: ≥70%
F: 50% to <70%
P: <50%

Coin and Key Mar Resistance of Coating Films

Each of the obtained test sheets was subjected to 15 passes with a frictional force of 9N using a Gakushin-type friction tester (FR-2S by Suga Test Instruments). The sandpaper used was #2400. After the test, and after air spraying the coating film surface, the 20° gloss before and after the test was measured using a gloss meter (Micro Tri Gross by Byk-Gardner), calculating the gloss retention by the following formula. An evaluation of G was acceptable, and F and P were unacceptable.

[Gloss after test/initial gloss]×100

G: ≥65%
F: 40% to <65%
P: <40% dispersion of acrylic resin-coated silica particles (C) is an acrylic resin-coated silica particle dispersion that is the reaction product of silica particles with a polymerizable unsaturated group (c1) and a polymerizable unsaturated monomer (c2), in a mass ratio of (c1):(c2)=20:80 to 90:10, the polymerizable unsaturated monomer (c2) comprises a polymerizable unsaturated monomer (c2-1) represented by the following formula (I):

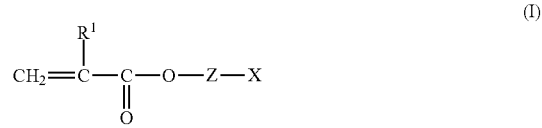

wherein $R^1$ represents a hydrogen atom or a methyl group, Z represents a structure including the following formula (II), and X represents a hydrogen atom or a (meth)acryloyl, alkyl, hydroxyl, amino, epoxy, alicyclic epoxy, carboxyl, mercapto, vinyl, isocyanate or aryl group;

wherein m represents a number of 5.5 to 160, $R^2$ represent phenyl groups or alkyl groups of 1 to 6 carbon atoms, which may be the same or different, and $R^3$ represents an alkylene group of 1 to 6 carbon atoms; and the molecular weight of the acrylic resin coating the silica particles is 400 to 6000.

TABLE 2

(Values in table are solid contents)

| | | Example | | | | | | | | | Comp. Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Coating composition | | (1) | (2) | (3) | (4) | (5) | (6) | (7) | (8) | (9) | (10) | (11) | (12) | (13) | (14) | (15) |
| Hydroxyl group-containing resin (A) | Resin (A-1) obtained in Production Example 1 | 83 | 83 | 83 | 83 | 83 | 83 | 83 | 83 | 83 | 83 | 83 | 83 | 83 | 83 | 83 |
| Curing agent (B) | N3300 | 17 | 17 | 17 | 17 | 17 | 17 | 17 | 17 | 17 | 17 | 17 | 17 | 17 | 17 | 17 |
| Acrylic resin-coated silica particle dispersion (C) | Acrylic resin-coated silica particle (c) dispersion | C-1 | C-2 | C-3 | C-4 | C-5 | C-6 | C-7 | C-8 | C-9 | C-10 | C-11 | C-12 | C-13 | C-14 | C-15 |
| | Content | 10 | 10 | 10 | 10 | 10 | 10 | 10 | 10 | 10 | 10 | 10 | 10 | 10 | 10 | 10 |
| Performance | Storage stability of coating material | G | G | G | G | G | G | G | G | G | G | P | P | G | G | G |
| | Mar resistance of coating film (Amtec Car washing damage) | G | G | G | G | G | G | G | G | G | G | G | G | G | G | G |
| | Mar resistance of coating film (Gakushin friction test: Dry scratch marks/coin and key scratches) | G | G | G | G | G | G | G | G | G | F | F | F | F | P | P |

The invention claimed is:

1. A coating composition comprising (A) a hydroxyl group-containing resin, (B) a curing agent and (C) a dispersion of acrylic resin-coated silica particles, wherein the 2. The coating composition according to claim 1, wherein $R^2$ in formula (II) is a methyl group.

3. The coating composition according to claim 1, wherein the content of the dispersion of acrylic resin-coated silica particles (C) is in the range of 1 to 15 mass % based on the total solid content of the hydroxyl group-containing resin (A) and the curing agent (B).

4. An article containing a coating film, obtained by applying the coating composition according to claim 1 onto an article.

5. A multilayer coating film-forming method, whereby a multilayer coating film is formed by applying at least one colored base coating material and at least one clear coating material in that order on an article to be coated, wherein the coating composition according to claim 1 is applied as the uppermost clear coating material.

* * * * *